No. 843,532. PATENTED FEB. 5, 1907.
L. G. HARPER.
MILKING DEVICE.
APPLICATION FILED JUNE 8, 1906.
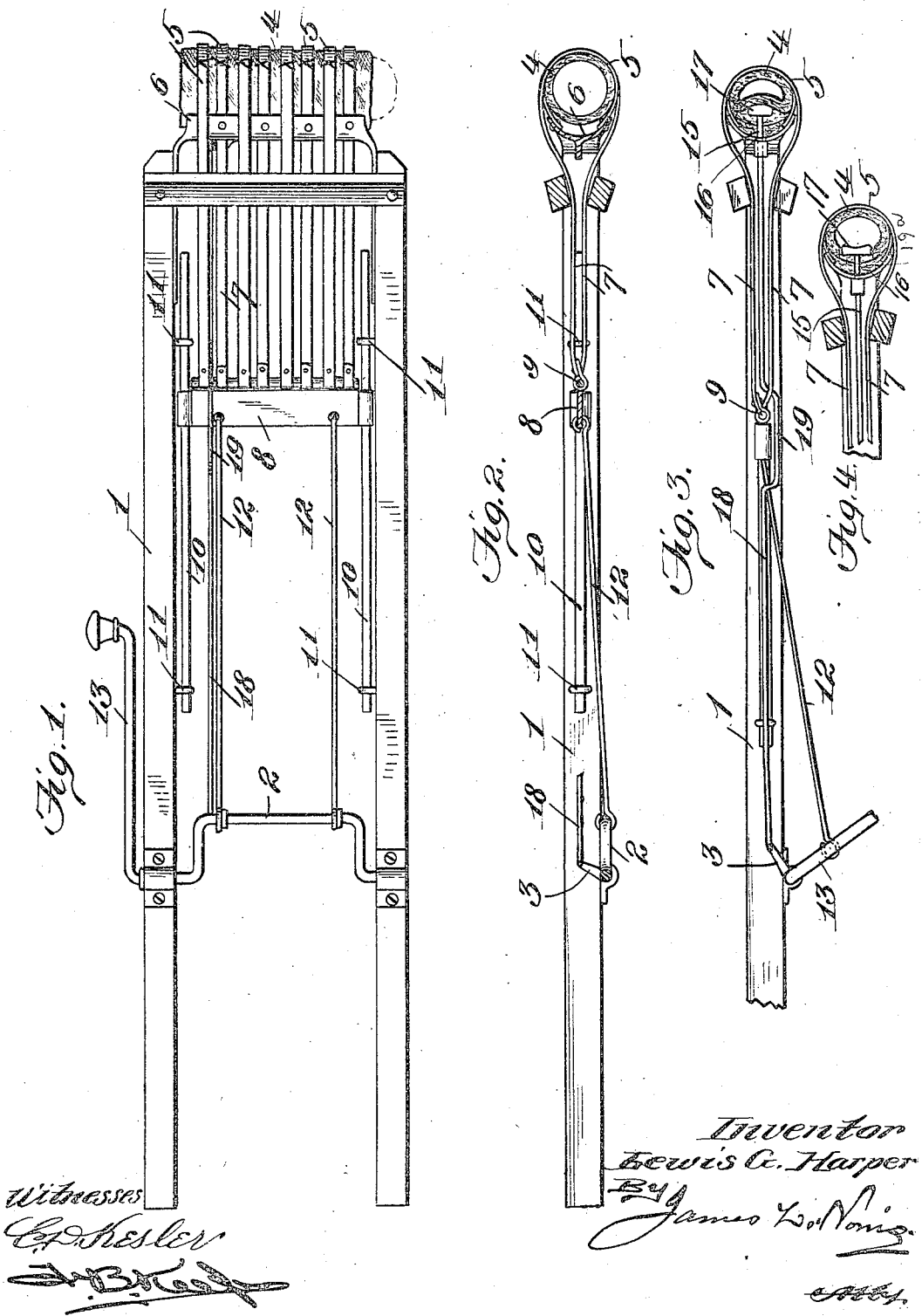
Witnesses
Inventor
Lewis G. Harper
By
James W. Norris
Atty.

UNITED STATES PATENT OFFICE.

LEWIS G. HARPER, OF WEST CHESTER, PENNSYLVANIA.

MILKING DEVICE.

No. 843,532.        Specification of Letters Patent.        Patented Feb. 5, 1907.

Application filed June 8, 1906. Serial No. 320,799.

*To all whom it may concern:*

Be it known that I, LEWIS G. HARPER, a citizen of the United States, residing at West Chester, in the county of Chester and State of Pennsylvania, have invented new and useful Improvements in Milking Devices, of which the following is a specification.

This invention relates to a milking device having a yieldable structure to readily conform to the contour of a teat and of a soft nature to avoid injury to the latter, and also embodying a shut-off means readily operative to close the upper portion of the teat just prior to the grasping of the teat by the remaining yielding structure.

This invention constitutes an improvement on that disclosed by my application filed November 14, 1905, Serial No. 287,275, and allowed December 29, 1905.

The object of the improvement is to prevent the milk drawn down in the teats from being forced upwardly into the udder, and thus render the yieldable structure arranged to grasp the teat or exert a uniformity of pressure thereon effective in relieving the teat of all the milk which has been drawn downwardly thereinto, and thereby also obviate injury to the cow.

The invention consists in the construction and arrangement of the several parts which will be more fully hereinafter set forth.

In the drawings, Figure 1 is a side elevation of a milking device embodying the features of the invention and showing the yieldable structure and remaining parts for coöperating with one teat. Fig. 2 is a horizontal section of the device. Fig. 3 is a top plan view showing a part of the supporting-frame removed and illustrating the operation of the yieldable or grasping structure and the shut-off means, the shut-off means having been actuated to close against the upper part of the teat. Fig. 4 is a detail horizontal section through a part of the apparatus, showing a modification.

Similar numerals of reference are employed to indicate corresponding parts in the several views.

The numeral 1 designates a frame, which may be of any preferred construction and dimensions to accommodate the apparatus.

In the accompanying drawings the apparatus is shown equipped with means for operation with one teat only. It will be understood that this means may be duplicated or the yieldable teat-grasping structure increased to engage two, three, or four teats. As the increase of the grasping structure would not modify the details, but all of such devices be precisely the same in arrangement, only one teat-engaging means has been shown. The frame supports a crank-shaft 2, which will be provided with as many cranks as there are yieldable teat-engaging structures supported by the frame, only one crank being shown in the present instance in addition to an auxiliary crank 3, standing at a different angle with respect to the main crank for the yieldable teat-engaging structure and adapted to operate the improved teat-shut-off means, which will be more fully hereinafter specified.

As in my application Serial No. 287,275, hereinbefore referred to, the yieldable teat-engaging structure embodies a soft lining 4, surrounded by yieldable bands 5, secured to a head 6, fastened to the members of the frame 1. Surrounding the soft lining 4, between the bands 5, are encircling pressure-bands 7. These pressure-bands 7 are connected to a slide-bar 8 through the medium of a holding-rod or analogous device 9, the slide-bar having its terminals secured to guide-rods 10, movable in guide-eyes or analogous devices 11, secured to the opposite members of the frame 1. The slide-bar 8 is attached to the main crank of the shaft 2 by connecting-rods 12, the said shaft having an operating-handle 13 for manual manipulation, or in some instances said handle may be attached to mechanism controlled by a motor. As the crank-shaft 2 is operated in a proper direction the slide-bar 8 will be drawn inward away from the head 6, and consequently the pressure-bands 7 will be caused to closely engage and compress the soft lining 4, as in the structure disclosed in my application aforesaid.

The improvement embodies a shut-off means for engaging the upper part of the teat, the engagement of this shut-off means taking place just prior to the compression of the bands 7 of the soft lining 4, so as to hold the milk down in the teat and prevent it from being forced upwardly into the udder when the compression-bands 7 are drawn taut around the lining. This shut-off means in the present instance consists of a plunger 15, movable through an opening 16 in the upper extremity of the head 6 and having a head 17, which is held in alinement and contacts with the upper end of the soft lining 4, close to the juncture of the teat with the udder. The plunger 15 has a reciprocating rod 18 attached thereto and provided with an offset 19 to clear the bar 8 and adjacent parts of the slide devices for operating the pressure or compression bands 7. The reciprocating rod 18 is attached to the crank 3 of the shaft 1, and, as before indicated, the said crank stands at such angle with respect to the main crank of the shaft for operating the pressure or compression bands 7 that the plunger 15 will be projected outwardly prior to the tightening of the said bands 7.

When the bands 7 are relaxed, the pressure of the head 17 of the plunger 15 is simultaneously relaxed and the milk from the udder is permitted to be drawn down into the teat for a successive similar operation. It will be seen that the milking device operates precisely like the human hand in pursuing the milking operation. In manual milking operations the index-finger of the hand is first drawn inwardly tight against the upper portion of the teat, while the remaining fingers and the thumb close over the teat below and force out the milk that may be drawn down from the udder.

Instead of having the head 17 of the plunger 15 press against the lining 4, the latter may have an opening 19$^a$ therein, as shown by Fig. 4, and through this opening the plunger 15 has movement, and the head 17 may be brought in direct contact with the teat.

The improved device overcomes the many disadvantages found to exist in milking-machines, particularly where compressed air is used or other motive means which institutes a severe down-drawing strain on the udder and ultimately resulting in an injury to the cow. In applying the improved device the same operation is pursued as disclosed in my application hereinbefore noted and consists in slipping the tubular portion of the milking device upwardly over the teat, and the compression of said lining then ensues and will be continued until the cow is thoroughly milked.

The use of a number of milking devices with one frame will enable an operator to engage all the teats of a cow and pursue the usual alternating pressure on such teats by disposing the cranks of the shaft at proper angles or at quarters.

It is proposed to modify the details of construction as well as the dimensions and proportions when found necessary within the scope of the invention.

Having thus fully described the invention, what is claimed as new is—

1. A milking device having a flexible compressible body, flexible means passing around the body and operating to contract the latter, and a shut-off means engaging the body and operating prior to the said flexible means.

2. A milking device having a compressible tubular body and compressing means passing around the said body, and a shut-off means engaging the body and operating to close the upper part of the teat prior to the operation of the compressing means.

3. A milking device having a compressible tubular body, and a teat-shut-off means engaging the upper portion of the body to shut off the corresponding part of the teat and operative prior to and during the compression of the said body.

4. A milking device having a resilient compressible body, compressing means around the body, and a shut-off device coöperating with the body to close the teat prior to the operation of the compressing means.

5. A milking device having a tubular body to engage a teat, a slidable shut-off means for engaging the upper portion of the body and teat to close the latter, and means for compressing the said body subsequent to the operation of the shut-off means, the movement of the said shut-off being independent of the compression of the body.

6. A milking device having a compressible tubular body, means for compressing said body, and a plunger engaging the upper portion of the said body to close the upper part of the teat prior to the operation of the means for compressing the body, the plunger moving independently of the compressing movement of the body.

7. In a milking device, the combination with a teat-compressing tubular means, of a teat-closing means operating prior to the said compressing means, the said teat-closing means moving independently of the teat-compressing means.

In testimony whereof I have hereunto set my hand in presence of two subscribing witnesses.

LEWIS G. HARPER.

Witnesses:
HOWARD S. GROFF,
JOS. H. BALDWIN.